Nov. 15, 1932.    J. A. LA GARDE    1,887,689
AUTOMOBILE JACK
Filed Feb. 26, 1932
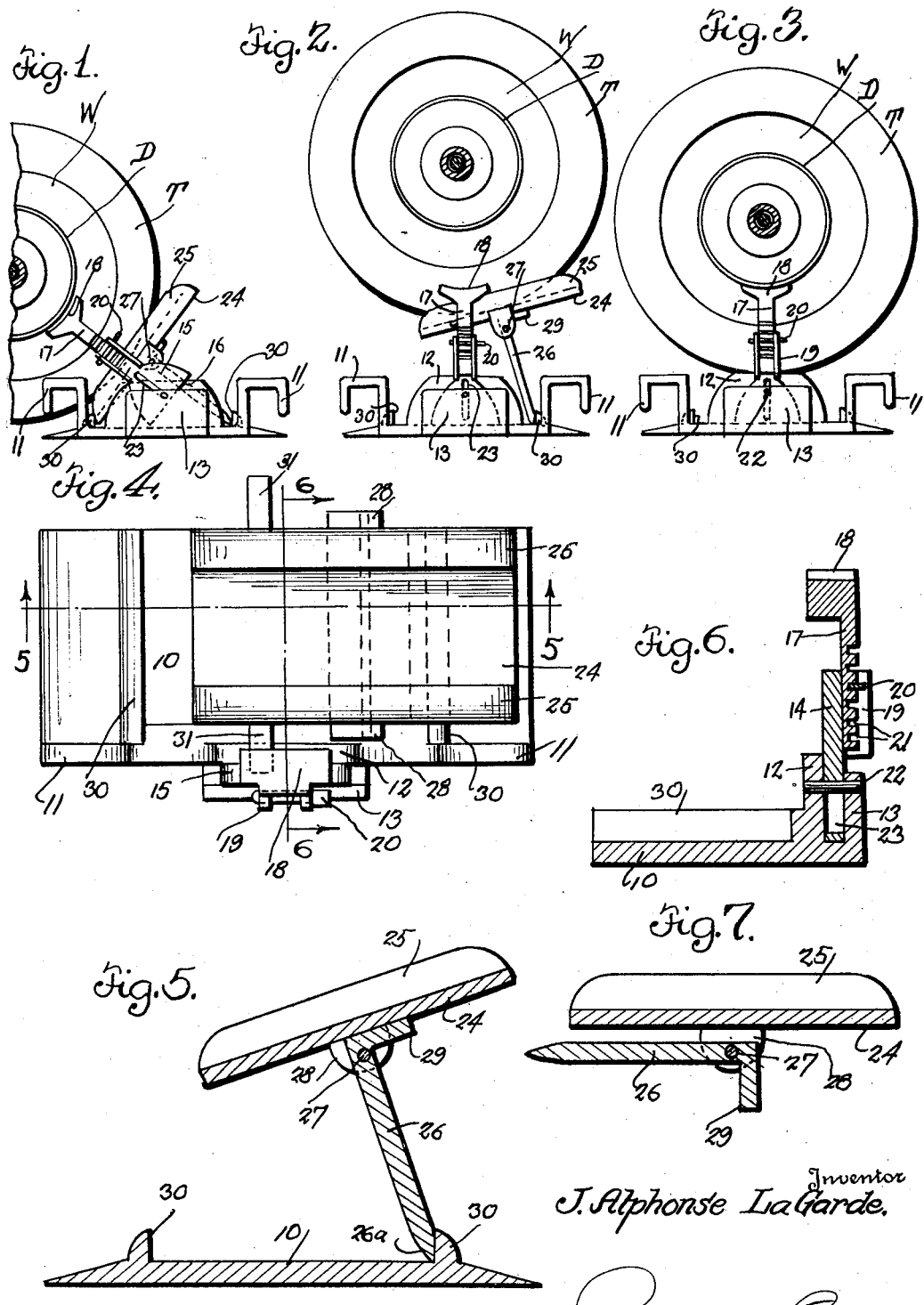
Inventor
J. Alphonse LaGarde.
By Bryant Lowry
Attorney s Patented Nov. 15, 1932

1,887,689

UNITED STATES PATENT OFFICE

JOSEPH ALPHONSE LA GARDE, OF SEEKONK, MASSACHUSETTS

AUTOMOBILE JACK

Application filed February 26, 1932. Serial No. 595,378.

This invention relates to certain new and useful improvements in automobile jacks.

The primary object of the invention is to provide an automobile jack that is automatic in its operation by having the automobile wheel engage with an inclined plane or support pivotally mounted upon a leg that is adapted to be moved from a normally inclined position when the automobile wheel is on the ground to a substantially vertical position with the inclined plane and supporting leg then collapsing to permit the brake drum carried by the wheel to drop upon and be supported by a jack stand.

It is a further object of the invention to provide an automobile jack of the foregoing character wherein the inclined plane with its supporting leg and the jack standard are normally inclined with the head of the jack standard aligned with the brake drum and the inclined plane engaged with the automobile tire with the jack standard automatically shifted to a perpendicular wheel supporting position upon upward movement of the inclined plane and supporting leg.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1 is a side elevational view of the jack stand and inclined plane with its supporting leg angularly tilted with the ground supporting tire engaged with the inclined plane and the head of the jack stand aligned with the brake drum of the wheel;

Figure 2 is a side elevational view showing the wheel elevated on the inclined plane with the jack stand shifted to perpendicular position by the inclined plane beneath the brake drum;

Figure 3 is a side elevational view after collapse and removal of the inclined plane with its supporting leg illustrating the wheel supported by the brake drum on the jack stand;

Figure 4 is a top plan view of the parts in the position illustrated in Figure 2;

Figure 5 is a vertical longitudinal sectional view taken on line 5—5 of Figure 4;

Figure 6 is a vertical cross-sectional view taken on line 6—6 of Figure 4, with the inclined plane and its supporting leg removed and illustrating the vertical adjustability of the jack stand; and Figure 7 is a detail sectional view of the inclined plane and its supporting leg showing the position assumed when collapsed.

Referring more in detail to the accompanying drawing, the automobile jack is of a portable character and includes a base plate 10 having a handle 11 rising from opposite ends thereof at one side to facilitate positioning of the jack relative to an automobile wheel. A perpendicular wall 12 rises from the side edge of the base plate 10 between the handles 11 with its opposite ends spaced from said handles for purposes presently to appear. A second perpendicular wall 13 rises from the base plate 10 outwardly of the wall 12 being parallel with said walls and spaced therefrom and a jack stand is mounted between the walls 12 and 13.

The jack stand comprises a lower leg portion 14 centrally rising from a relatively wider foot 15 having a straight lower edge 16 extending at right angles to the longitudinal axis of the lower portion 14 of the jack leg. The upper portion 17 of the jack leg is provided with a brake drum supporting head 18, the upper leg portion 17 being slidable upon the lower leg portion 14 and guided by side flanges 19 carried by the lower leg portion and through which flanges a key 20 slidably extends for selective engagement in spaced notches 21 provided in the adjacent side of the upper portion 17 to vary the height of the jack stand. The foot 15 of the jack stand is disposed between the perpendicular walls 12 and 13 and is confined therein by a cross pin 22 extending between said walls 12 and 13 and through the slot 23 provided in the foot 15 and extending longitudinally of the jack stand as shown in Figures 1 to 3.

The device for effecting elevation of the automobile wheel into position for mounting on the jack stand is herein referred to as an inclined plane and includes a plate 24 for the support of a wheel tire with longitudinal side edge flanges 25 to maintain the plate positioned with respect to the tire together with a supporting leg 26 of a width substantially the same as the tire supporting plate 24 with the upper end of the supporting leg 26 pivotally mounted upon the cross shaft 27 carried by depending side lugs 28 on the plate 24. The upper end of the supporting leg 26 carries a right angularly directed flange 29 for flat engagement with the underside of the tire supporting plate 24 to prevent pivotal movement of the tire supporting plate in one direction. A cross shoulder 30 rises from the base plate 10 adjacent each end thereof and the lower tapered end 26a of the supporting leg 26 of the inclined plane is selectively engaged with one of said shoulders as an abutment and according with which wheel of the automobile the automatic jack is to be associated.

In the operation of the jack, the same is positioned rearwardly of the rear wheel of an automobile or forwardly of a front wheel thereof, the jack stand being swung laterally, limited by its pin and slot connection with the perpendicular walls 12 and 13 to be aligned with the brake drum D of the automobile wheel W. The inclined plane is then disposed with the lower end 26a of the supporting leg 26 engaged with a shoulder 30 and the plate 24 engaged with the tire T with the automobile wheel resting on the ground. The automobile is then moved in the direction of the jack, the wheel rising upwardly upon the plate 24 of the inclined plane with the lower end 26a of the supporting leg acting as a pivot, the automobile moving until the wheel assumes a position substantially as illustrated in Figure 2. During upward swinging movement of the inclined plane, one of the arms 31 projecting laterally of the wheel supporting plate 24 engages the jack stand to shift the same to the perpendicular position shown in Figure 2 with the jack stand then supported by its lower straight edge 16 of the foot portion 15 upon the base plate 10. As the line of downward pressure of the wheel on the inclined plane is directly above the jack stand and laterally of the pivot shaft 27 of the inclined plane, the latter will collapse and the automobile wheel will drop with the brake drum D received on the head 18 of the jack stand. To remove the wheel from the jack, it is only necessary to move the automobile in a direction of movement opposite to the mounting thereof upon the jack. It will therefore be seen that the jack is entirely automatic in its operation, the same being operatively positioned with respect to the desired wheel that it is desired to elevate, movement of the automobile in the proper direction causing elevation of the wheel on the inclined plane and the subsequent automatic dropping of the wheel onto the jack stand.

While there is herein shown and described the preferred embodiment of the invention, it is nevertheless to be understood that minor changes may be made therein without departing from the spirit and scope of the invention as claimed.

I claim:—

1. In an automatic automobile jack, a portable base plate, a jack-stand translatably mounted thereon, and an inclined plane for the elevation of a wheel detachably engaged with the base plate.

2. In an automatic automobile jack, a portable base plate, a jack-stand translatably mounted thereon, an inclined plane for the elevation of a wheel detachably engaged with the base plate, the inclined plane comprising a wheel tire supporting plate and a supporting leg pivotally depending from the plate and abuttingly engaged with the base plate.

3. In an automatic automobile jack, a portable base plate, a jack-stand translatably mounted thereon, an inclined plane for the elevation of a wheel detachably engaged with the base plate, the inclined plane comprising a wheel tire supporting plate and a supporting leg pivotally depending from the plate and abuttingly engaged with the base plate, and the tire supporting plate pivoting in one direction only on the supporting leg.

4. In an automatic automobile jack, a portable base plate, a jack-stand translatably mounted thereon, an inclined plane for the elevation of a wheel detachably engaged with the base plate, the inclined plane comprising a wheel tire supporting plate and a supporting leg pivotally depending from the plate and abuttingly engaged with the base plate, and operating connections between the jack-stand and supporting leg for moving the jack stand from an inclined to a perpendicular position during upward movement of the inclined plane when raising a wheel.

5. In an automatic automobile jack, a portable base plate, a jack-stand translatably mounted thereon, an inclined plane for the elevation of a wheel detachably engaged with the base plate, the inclined plane comprising a wheel tire supporting plate and a supporting leg pivotally depending from the plate and abuttingly engaged with the base plate, the tire supporting plate pivoting in one direction only on the supporting leg, and operating connections between the jack-stand and supporting leg for moving the jack stand from an inclined to a perpendicular position during upward movement of the inclined plane when raising a wheel.

6. In an automatic automobile jack, a portable base plate, a jack-stand translatably mounted thereon, an inclined plane for the elevation of a wheel detachably engaged with the base plate, the inclined plane comprising a wheel tire supporting plate and a supporting leg pivotally depending from the plate and abuttingly engaged with the base plate, the tire supporting plate pivoting in one direction only on the supporting leg, operating connections between the jack-stand and supporting leg for moving the jack stand from an inclined to a perpendicular position during upward movement of the inclined plane when raising a wheel, and said jack-stand including vertically adjustable leg sections.

7. In an automatic automobile jack, a base plate, a jack-stand having a pin and slot connection with the base plate whereby the jack-stand may be alined with the brake drum of a wheel when ground supported, and a collapsible member abuttingly engaged with the base plate and normally inclined for engagement with a wheel tire for elevating the wheel when the wheel moves towards the same and means carried by the collapsible member for moving the jack-stand to vertical position, the jack-stand having a flat base for the support thereof.

In testimony whereof I affix my signature.

JOSEPH ALPHONSE LA GARDE.